US012627940B2

(12) United States Patent
Pollak et al.

(10) Patent No.: US 12,627,940 B2
(45) Date of Patent: May 12, 2026

(54) VEHICLE CABIN SIMULATION FOR AUDIO TUNING AND TESTING

(71) Applicant: Aptiv Technologies AG, Schaffhausen (CH)

(72) Inventors: Lukasz Pollak, Cracow (PL); Marta Twardowska, Cracow (PL)

(73) Assignee: Aptiv Technologies AG, Schaffhausen (CH)

( * ) Notice: Subject to any disclaimer, the term of this patent is extended or adjusted under 35 U.S.C. 154(b) by 151 days.

(21) Appl. No.: 18/599,806

(22) Filed: Mar. 8, 2024

(65) Prior Publication Data

US 2025/0193620 A1 Jun. 12, 2025

(30) Foreign Application Priority Data

Dec. 12, 2023 (EP) .................................... 23215759

(51) Int. Cl.
*H04S 7/00* (2006.01)
*H04S 3/00* (2006.01)

(52) U.S. Cl.
CPC .............. *H04S 7/301* (2013.01); *H04S 3/008* (2013.01); *H04S 7/302* (2013.01); *H04S 2400/01* (2013.01); *H04S 2400/15* (2013.01); *H04S 2420/11* (2013.01)

(58) Field of Classification Search
CPC .......... H04S 7/301; H04S 3/008; H04S 7/302; H04S 2400/01; H04S 2400/15; H04S 2420/11; H04S 7/305; H04S 3/00; H04S 7/00; H04R 2499/13; H04R 29/001
See application file for complete search history.

(56) References Cited

U.S. PATENT DOCUMENTS

2022/0240043 A1 7/2022 Sunder

FOREIGN PATENT DOCUMENTS

DE 102022117701 * 7/2022 ............ H04S 7/304

OTHER PUBLICATIONS

Remote Sound Tuning in Automobile, Jun. 9, 2021 (11 Pages) by Michael, Christof and Marc.*
Audio Product Education Institute, "Remote Sound Tuning in Automobiles," Webinar Event , https://audioproducteducationinstitute.org/remote-sound-tuning-in-automobiles/, 11 pages Jun. 9, 2021.
DSP Concepts, "Automotive Signal Processing," https://w.dspconcepts.com/automotive, 12 pages, retrieved Mar. 8, 2024.
Illusonic, Audio Processors, https://www.illusonic.com/en/audio-processors/iap/, 1 page, retrieved Mar. 8, 2024.

(Continued)

*Primary Examiner* — Yosef K Laekemariam
(74) *Attorney, Agent, or Firm* — Miller Johnson

(57) ABSTRACT

A method of simulating a vehicle cabin for audio tuning and/or testing. The method includes obtaining and storing a 3D impulse response corresponding to each speaker within the cabin of a vehicle to be simulated. The method includes at a location remote from the vehicle, in real-time, applying convolution processing on each channel of a multichannel audio stream based on the corresponding 3D impulse response. The method includes outputting a surround sound format audio stream.

11 Claims, 3 Drawing Sheets

(56) References Cited

OTHER PUBLICATIONS

Extended European Search Report for EP23215759.4 dated Jun. 4, 2024, 9 pages.

Kaplanis, Neofytos, et al. "A method for perceptual assessment of automotive audio systems and cabin acoustics." Audio Engineering Society Conference: 60th International Conference: DREAMS (Dereverberation and Reverberation of Audio, Music, and Speech). Audio Engineering Society, 2016, 9 pages.

Tervo, Sakari, et al. "Spatial decomposition method for room impulse responses." Journal of the Audio Engineering Society 61.1/2 (2013): 17-28.

Squartini, Stefano, et al. "Evaluating different vehicle audio environments through a novel software-based system." Audio Engineering Society Convention 116. Audio Engineering Society, 2004, 14 pages.

* cited by examiner

VEHICLE CABIN SIMULATION FOR AUDIO TUNING AND TESTING

CROSS-REFERENCE TO RELATED APPLICATIONS

This application claims priority to EP 23 215 759 filed Dec. 12, 2023. The entire disclosure of which is incorporated by reference.

FIELD

The present disclosure relates to the field of tuning and testing audio systems in automobiles. In particular, simulation of acoustic properties from within a vehicle cabin to enable configuration of a sound system for use in a real-world vehicle corresponding to the simulated vehicle cabin.

BACKGROUND

Tuning and testing audio systems in a car cabin is known to be complex and time-consuming. Tools are available for remote sound tuning in automobiles, e.g. by simulating cabin impulse response a preliminary set of parameters can be defined which significantly shortens the time spent on actual in-car tuning. Yet, simulation of multichannel car audio systems is problematic.

One known solution is based on offline adjustment of gains, equalization, and delays for particular speakers. However, there is no possibility to listen to a created preset outside of the car cabin, i.e. in a separate listening environment that is not the vehicle itself. This implementation will show only the influence of tuning parameters on impulse responses, which were measured earlier.

An alternative tool offers similar remote calibration opportunities, allowing pre-processing of input audio files to generate auralization output for all car speakers together, which can be listened to on headphones. This solution uses mono cabin impulse response measurements combined with generic HRTF (Head-Related Transfer Function) for auralization (i.e. simulated acoustic experience in a virtual space).

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In light of the above, the present invention seeks to address shortcomings associated with known simulation solutions or at least provide an alternative approach of utility to those skilled in the field.

A first aspect of the invention is outlined according to claim 1 of the appended claims. For example, a method of simulating a vehicle cabin for audio tuning and testing is described herein, including the steps of: recording, with a microphone (e.g. a set of microphones and encoding device), a 3D impulse response for each speaker within the cabin of a vehicle to be tuned; storing said impulse responses; at a location remote from the vehicle, playing back/sending (e.g. generating or acquiring/sourcing) a multichannel audio stream, performing real-time convolution processing on each channel of the audio stream based on the corresponding 3D impulse response; outputting an audio stream.

An example of a multi-channel/full-sphere surround sound format is Ambisonics, e.g. with a resulting signal stored in B-format. An example of a first order ambisonic microphone is a Zoom H3-VR recorder unit which comprises four spaced-apart microphones for capturing sound in multiple directions. In the known way, an impulse response may be obtained by playback of a test tone (e.g. sine sweep) through each speaker of the vehicle cabin and capturing of same with suitable hardware.

In an embodiment, the at least one predetermined position comprises a driver position/head level. However, this may further comprise a plurality of predetermined positions corresponding to passenger positions.

In this way, an accurate acoustical reproduction of a car cabin may be achieved on any sound system, or headphones, remote from the vehicle. Real-time multi-channel processing may be performed directly on target hardware, e.g. the vehicle's audio control unit, or a PC based application.

According to the disclosed method, it is possible to tune all audio blocks, not only gain, delay and equalization. Furthermore, testing of complex audio algorithms is possible, e.g. ANC (active noise cancellation), 3D effects, etc.

In embodiments, the real-time processing is integrated with the vehicle's own onboard audio software/framework, e.g. which is ordinarily supplied to an OEM for adapting to different cabin settings and car configurations. Such a solution may span the entire audio software stack-including DSP (digital signal processing), audio management, control logic, and tuning and calibration functions. By centralizing audio processing in a cockpit domain controller instead of in audio nodes, it is possible to fully integrate embedded real-time software and eliminate the need for an external unit for audio processing, leading to reduced cost. The system used for calibration according to the present disclosure can be a mock up (e.g. having the same processing blocks as the onboard system) or the real system itself.

In embodiments, the output sound format (e.g. a universal immersive output format such as Ambisonic B-format) may be decoded at an end point audio system in real-time. For example, a multi-speaker listening room where an experienced automotive audio tuning engineer can listen to an audio reference track (e.g. a familiar piece of music), augmented by the output sound format, and make adjustments to parameters thereof. The engineer is listening for sound imbalance and undesirable resonances, for subsequent elimination in playback.

Adjustments made by the engineer may be stored in a suitable format to provide an output set of instructions for implementation in the real-world vehicle's onboard sound controller to optimize its speaker system. A separately tuned solution would typically be expected for each vehicle cabin specification and speaker system combination. The invention enables processing the 3D sound in real-time, allowing the engineer to experience the changes applied as he/she goes.

The invention is applicable not just to car cabins but other vehicle spaces for creating an acoustic simulation thereof. Indeed, the core concept may be applied to acoustic reproduction, for the purpose of tuning and/or testing, of any space (enclosed or otherwise).

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will now be described with reference to the accompanying drawings in which.

In the drawings, reference numbers may be reused to identify similar and/or identical elements.

DETAILED DESCRIPTION

Introduction

Figure 1:
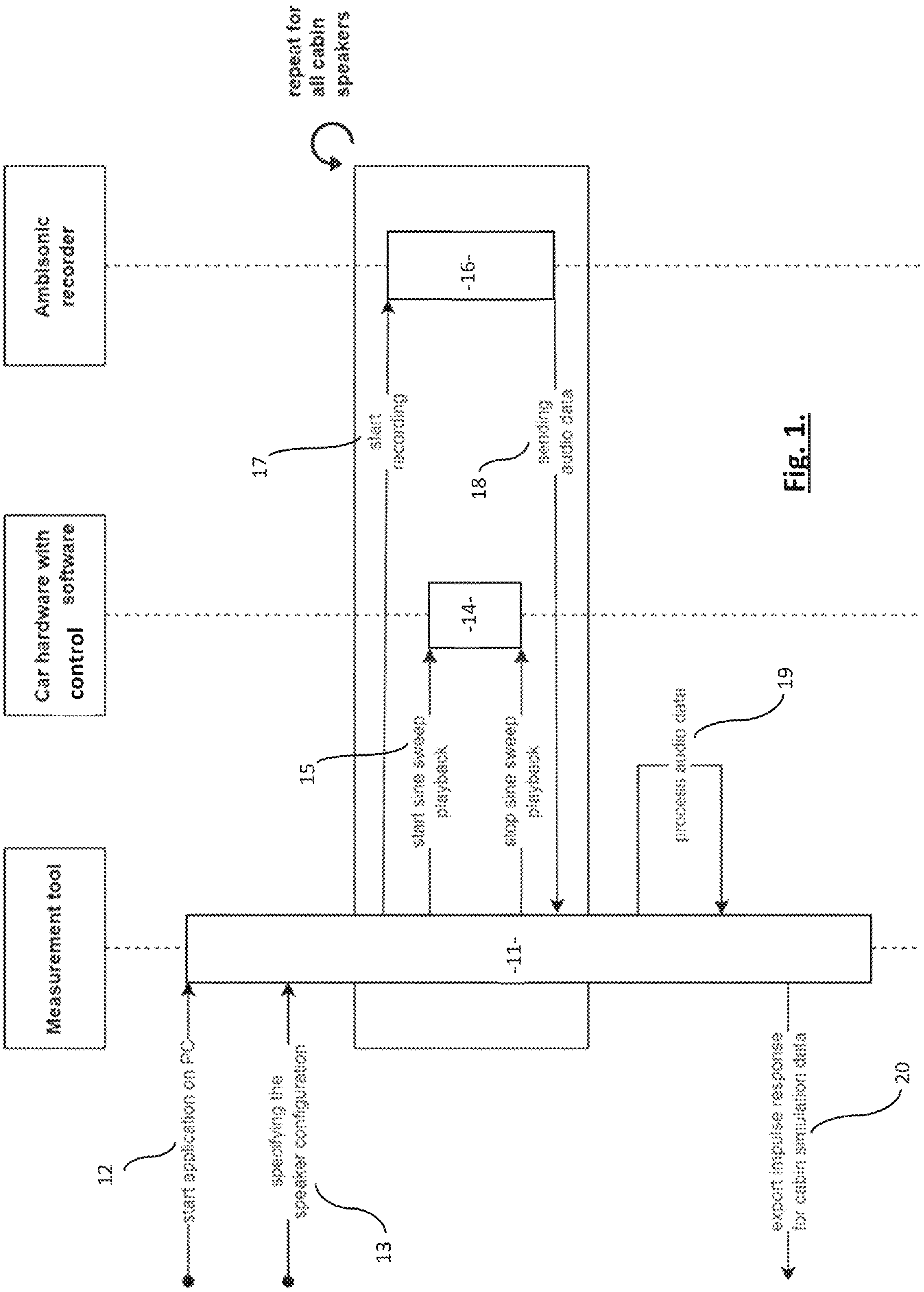
FIG. 1 schematically illustrates a measurement sequence.

The following description presents example embodiments and, together with the drawings, serves to explain principles of the invention. However, the scope of the disclosure is not intended to be limited to the precise details of the embodiments or exact adherence with all features and/or method steps, since variations will be apparent to a skilled person and are deemed also to be covered by the description. Terms for components used herein should be given a broad interpretation that also encompasses equivalent functions and features. In some cases, several alternative terms (synonyms) for structural features have been provided but such terms are not intended to be exhaustive. Descriptive terms should also be given the broadest possible interpretation; e.g. the term "comprising" as used in this specification means "consisting at least in part of" such that interpreting each statement in this specification that includes the term "comprising", features other than that or those prefaced by the term may also be present. Related terms such as "comprise" and "comprises" are to be interpreted in the same manner.

The description herein refers to embodiments with particular combinations of steps or features, however, it is envisaged that further combinations and cross-combinations of compatible steps or features between embodiments will be possible. Indeed, isolated features may function independently as an invention from other features and not necessarily require implementation as a complete combination.

It will be understood that the illustrated embodiments show applications only for the purposes of explanation. In practice, the invention may be applied to many different configurations, where the embodiment is straightforward for those skilled in the art to implement.

As alluded to in the background section above, real-time simulation of multichannel car audio systems according to existing methods is impossible or at least very limited. By contrast, through the use of 3D impulse response measurements and real-time convolution, the present disclosure enables reproduction of the measured audio system outside the vehicle, i.e. a virtual version of the vehicle cabin, on any multichannel speaker configuration (e.g. 5.1 system or headset). According to a practical implementation, in-cabin measurements can be carried out using an ambisonic microphone or recorder such as the Zoom® H3-VR.

Integration of this concept with an existing vehicle audio framework (e.g. the applicant's Aptiv Sound Framework) allows one to simulate and tune, in real-time, respective audio signals on a PC or hardware setup outside the vehicle.

Moreover, implementation of the solution described herein as an output block of the vehicle audio framework provides the opportunity of tuning other processing blocks, e.g. compressor, limiter, or third-party algorithms, and not only EQ, gains, and delays commonly adjusted by tuning engineers. Furthermore, other algorithms such as active noise cancelation and 3D effects can be tested with the proposed algorithm on any multichannel, reference audio system.

FIG. 1 schematically illustrates a measurement sequence. For example, a measurement tool 11 application can be activated on a PC at step 12 where a speaker configuration is specified at 13 from a list of common options (or customised).

The measurement tool 11 interacts with vehicle hardware 14 controlled by software configured for the vehicle model. The measurement tool initiates, via the vehicle hardware, a measurement signal (e.g. sine sweep) 15 for the purpose of measuring an impulse response of a first speaker. Simultaneously, a recorder 16 (e.g. ambisonics recorder device with a set of microphones) starts recording the sine sweep 17 and captures this audio data for, upon termination of the sine sweep, communication 18 back to the measurement tool 11.

The microphone set may be located at a first head position of a vehicle occupant, e.g. at a driver's seat.

Step 19 indicates audio data processing of the captured signal from the cabin by the measurement tool 11 and calculating the impulse response, followed by an export function 20, i.e. the resultant impulse response is exported from the measurement tool, for later use in cabin simulation.

The measurement sequence should be repeated for all cabin speakers as indicated by reference numeral 21. Each recording is typically a separate file, but all the sources can be recorded in unison and exported at once.

The complete speaker set up can also be recorded according to the above sequence from alternative positions in the cabin, i.e. corresponding to other occupant locations.

Figure 2:
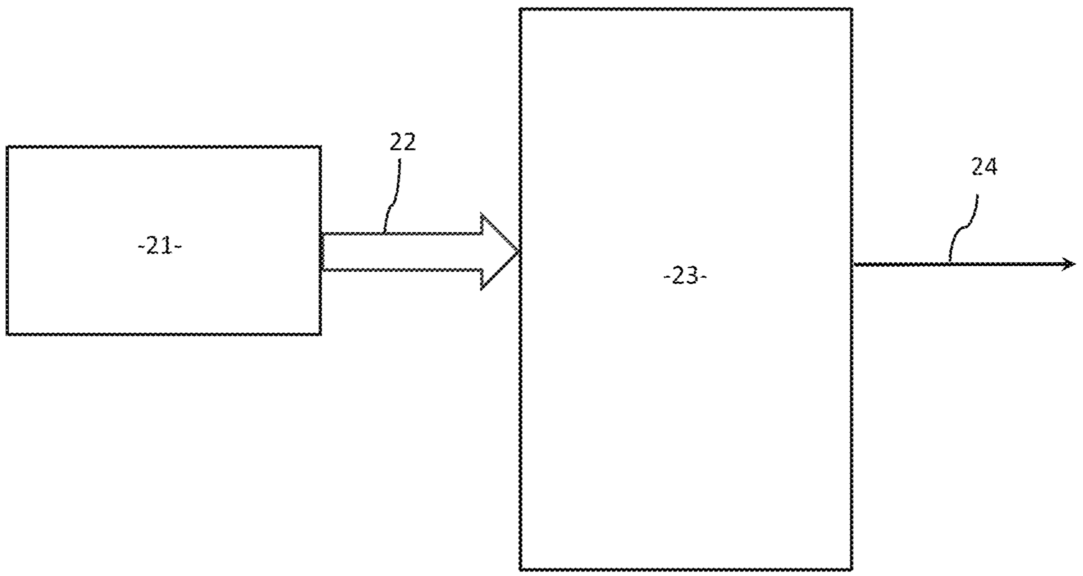
FIG. 2 schematically illustrates a simplified process flow diagram.

FIG. 2 illustrates a simplified explanation of how the resultant 3D impulse responses are utilized at a location remote from the subject vehicle. For example, box 21 represents a multichannel audio endpoint (or "sink", e.g. endpoint where the signal from different audio sources is routed) with functional equivalence to the sound system and control software/platform from which vehicle audio is able to be played back. The wide arrow 22 represents a multichannel audio stream of a reference track routed to a cabin simulation functional block 23 (i.e. simulation sink) where convolution of every channel is processed with the corresponding 3D impulse response for specific speakers. The output 24 is, in the example form described herein, a B-format audio stream. After decoding, the output audio stream 24 may be played back in real time in a listening room (or on headphones) which effectively reproduces the acoustic space of the vehicle. Adjustments, commonly referred to as "tuning", can then be made to the control software at box 21. Any capabilities of the vehicle sound system can be tested through the simulated space, enabling an accurate audition of all functions, without needing to be present at the test vehicle.

Figure 3:
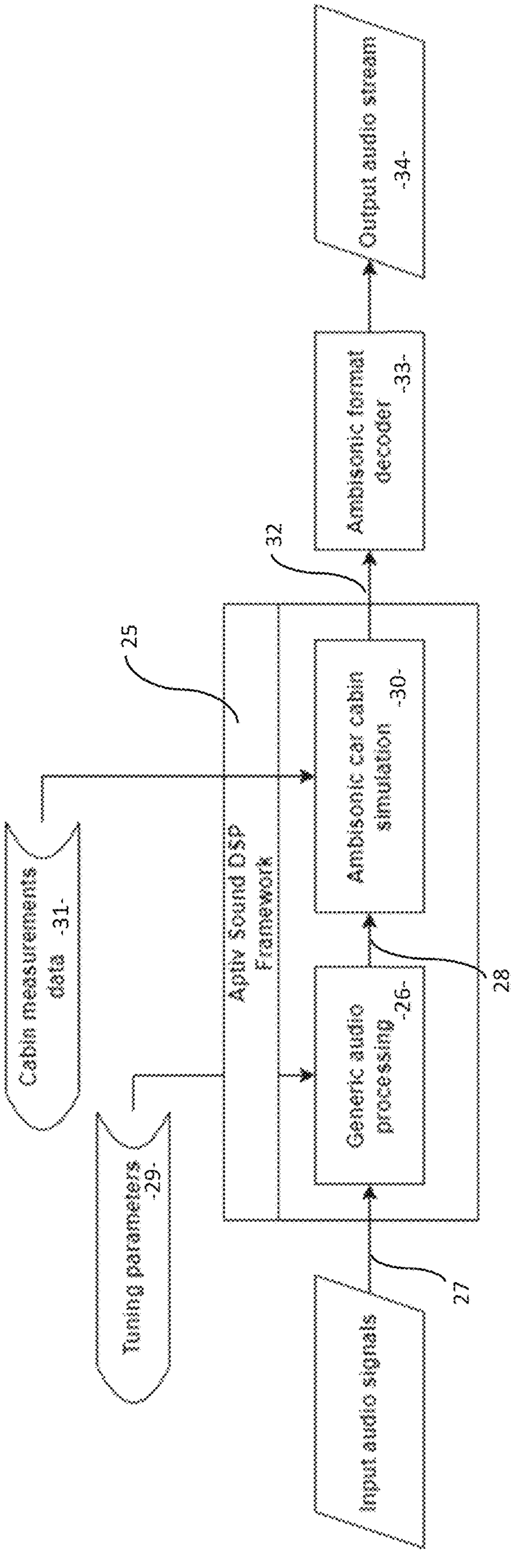
FIG. 3 schematically illustrates a more detailed process flow diagram. present disclosure will become more fully understood from the detailed description and the accompanying drawings.

FIG. 3 illustrates an alternative representation of the process flow, particularly showing how the method enables integration with an existing vehicle sound system control platform.

A vehicle sound system, indicated as "Aptiv™ Sound DSP Framework" 25, may comprise generic audio processing at box 26, which receives input audio signals 27, the playback 28 of which may be adjusted by tuning parameters

29. Within the DSP platform 25 a cabin simulation block 30, configured according to input cabin measurement data 31 derived at FIG. 1, processes the audio stream output 32, i.e. in Ambisonics B-format, for communication to a decoder 33 and subsequent output audio stream 34 at a multi-speaker listening room or via headphones.

Changes in the tuning parameters and/or any 3D effects or functional processing capability of the platform may follow through the chain to be simulated for appraisal by an engineer. Revisions to the parameters are audible in real time for the engineer. When the audio experience has been optimized, i.e. tuning parameters have been determined, these can be stored in a suitable format for uploading to the sound system platform of the real-world vehicle. A plurality of optimizations may be stored for selection by an end user.

By way of summary, a method and corresponding system for simulating a vehicle cabin for audio tuning and/or testing are disclosed. The method may comprise obtaining, e.g. by recording, and storing a 3D impulse response corresponding to each speaker within the cabin of a vehicle to be simulated. At a later time and remote from the vehicle, a multichannel input audio stream may be obtained and sent, in real-time, and each channel is processed by any convolution processing according to the corresponding speaker to create a surround sound format audio stream. The audio stream, e.g. in Ambisonics format, may be decoded and played back in a listening room (or via headphones) such that a tuning engineer may make adjustments in parameters of the input audio stream that carry through in real-time to the simulated environment listening experience. In this way, the parameters can be optimized and applied back to the sound system of the real-world vehicle.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. In the written description and claims, one or more steps within a method may be executed in a different order (or concurrently) without altering the principles of the present disclosure. Similarly, one or more instructions stored in a non-transitory computer-readable medium may be executed in a different order (or concurrently) without altering the principles of the present disclosure. Unless indicated otherwise, numbering or other labeling of instructions or method steps is done for convenient reference, not to indicate a fixed order.

Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship encompasses a direct relationship where no other intervening elements are present between the first and second elements as well as an indirect relationship where one or more intervening elements are present between the first and second elements.

As noted below, the term "set" generally means a grouping of one or more elements. However, in various implementations a "set" may, in certain circumstances, be the empty set (in other words, the set has zero elements in those circumstances). As an example, a set of search results resulting from a query may, depending on the query, be the empty set. In contexts where it is not otherwise clear, the term "non-empty set" can be used to explicitly denote exclusion of the empty set—that is, a non-empty set will always have one or more elements.

A "subset" of a first set generally includes some of the elements of the first set. In various implementations, a subset of the first set is not necessarily a proper subset: in certain circumstances, the subset may be coextensive with (equal to) the first set (in other words, the subset may include the same elements as the first set). In contexts where it is not otherwise clear, the term "proper subset" can be used to explicitly denote that a subset of the first set must exclude at least one of the elements of the first set. Further, in various implementations, the term "subset" does not necessarily exclude the empty set. As an example, consider a set of candidates that was selected based on first criteria and a subset of the set of candidates that was selected based on second criteria; if no elements of the set of candidates met the second criteria, the subset may be the empty set. In contexts where it is not otherwise clear, the term "non-empty subset" can be used to explicitly denote exclusion of the empty set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" can be replaced with the term "controller" or the term "circuit." In this application, the term "controller" can be replaced with the term "module." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); processor hardware (shared, dedicated, or group) that executes code; memory hardware (shared, dedicated, or group) that is coupled with the processor hardware and stores code executed by the processor hardware; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2020 (also known as the WIFI wireless networking standard) and IEEE Standard 802.3-2018 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module. For example, the client module may include a native or web application executing on a client device and in network communication with the server module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

The memory hardware may also store data together with or separate from the code. Shared memory hardware encompasses a single memory device that stores some or all code from multiple modules. One example of shared memory hardware may be level 1 cache on or near a microprocessor die, which may store code from multiple modules. Another example of shared memory hardware may be persistent storage, such as a solid state drive (SSD) or magnetic hard disk drive (HDD), which may store code from multiple modules. Group memory hardware encompasses a memory device that, in combination with other memory devices, stores some or all code from one or more modules. One example of group memory hardware is a storage area network (SAN), which may store code of a particular module across multiple physical devices. Another example of group memory hardware is random access memory of each of a set of servers that, in combination, store code of a particular module. The term memory hardware is a subset of the term computer-readable medium.

The apparatuses and methods described in this application may be partially or fully implemented by a special-purpose computer created by configuring a general-purpose computer to execute one or more particular functions embodied in computer programs. Such apparatuses and methods may be described as computerized or computer-implemented apparatuses and methods. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special-purpose computer, device drivers that interact with particular devices of the special-purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method of determining a set of instructions relating to parameter adjustments for turning a vehicle speaker system, the method comprising:

retrieving a stored 3D impulse response corresponding to each speaker of the vehicle speaker system within a cabin of a vehicle;

at a location remote from the vehicle, in real-time, applying convolution processing on each channel of an input multichannel audio stream, wherein:

the input multichannel audio stream is based on the stored 3D impulse response, each channel of the input multichannel audio stream corresponds to one or more speakers of the vehicle speaker system, and the input multichannel audio stream is generated by a vehicle sound system platform corresponding to the vehicle speaker system;

adjusting the input multichannel audio stream according to at least one parameter affecting the input multichannel audio stream, wherein adjustments of the at least one parameter are reproduced in real-time in an output surround sound format audio stream for decoding and playback in a multi-channel listening room or headphones; and determining tuning adjustments to the at least one parameter and storing the tuning adjustments as a set of output instructions configured for use in a real-world vehicle's onboard sound controller to optimize its speaker system.

2. The method of claim 1 wherein the at least one parameter is selected from at least one of: gain, equalization, delay, compressor, limiter, active noise cancellation, or 3D effects.

3. The method of claim 1 wherein the 3D impulse response is obtained by recording with a surround sound set of microphones and storing the 3D impulse response.

4. The method of claim 3 wherein:

obtaining the 3D impulse response is executed from at least one predetermined position within the cabin; and a set of impulse responses is stored according to a respective predetermined position.

5. The method of claim 4 wherein the at least one predetermined position is a driver's position.

6. A system for simulating a vehicle cabin for audio tuning and/or testing, the system comprising:

memory configured to store instructions;

at least one processor configured to execute the instructions, wherein the instructions include:

retrieving a stored 3D impulse response corresponding to each speaker of a vehicle speaker system within a cabin of a vehicle;

at a location remote from the vehicle, in real-time, applying convolution processing on each channel of an input multichannel audio stream, wherein:

the input multichannel audio stream is based on the stored 3D impulse response, each channel of the input multichannel audio stream corresponds to one or more speakers of the vehicle speaker system, and the input multichannel audio stream is generated by a vehicle sound system platform corresponding to the vehicle speaker system;

adjusting the input multichannel audio stream according to at least one parameter affecting the input multichannel audio stream, wherein adjustments of the at least one parameter are reproduced in real-time in an output surround sound format audio stream for decoding and playback in a multi-channel listening room or headphones; and determining tuning adjustments to the at least one parameter and storing the tuning adjustments as a set of output instructions configured for use in a real-world vehicle's onboard sound controller to optimize its speaker system; and vehicle sound system hardware for sending a multichannel input audio stream and applying the convolution processing thereon.

7. The system of claim 6, wherein:

the instructions include outputting a surround sound format audio stream, and the system further comprises a decoder for decoding the surround sound format audio stream.

8. The system of claim 7 wherein the decoder is configured for decoding an Ambisonics format.

9. The system of claim 7 further comprising multi-channel listening room hardware or headphones for playback of the decoded surround sound format audio stream.

10. A non-transitory computer readable medium comprising an output set of instructions configured to cause a vehicle sound controller to apply parameter adjustments to optimize a vehicle speaker system, the output set of instructions having been determined by:

retrieving a stored 3D impulse response corresponding to each speaker of the vehicle speaker system within a cabin of a vehicle;

at a location remote from the vehicle, in real-time, applying convolution processing on each channel of an input multichannel audio stream based on the stored 3D impulse response, wherein the input multichannel audio stream is generated by a vehicle sound system platform corresponding to the vehicle speaker system; and adjusting the input multichannel audio stream according to at least one parameter affecting the input multichannel audio stream, wherein adjustments of the at least one parameter are reproduced in real-time in an output surround sound format audio stream for decoding and playback in a multi-channel listening room or headphones.

11. A vehicle sound controller including:

memory for storing a set of instructions; and one or more processors configured to execute the set of instructions and, when executed, provide an output to control a vehicle speaker system optimized according to the set of instructions, wherein the set of instructions is determined by:

retrieving a stored 3D impulse response corresponding to each speaker within a cabin of a vehicle;

at a location remote from the vehicle, in real-time, applying convolution processing on each channel of an input multichannel audio stream based on the stored 3D impulse response, wherein the input multichannel audio stream is generated by a vehicle sound system platform corresponding to that of the vehicle; and adjusting the input multichannel audio stream according to at least one parameter affecting the input multichannel audio stream, wherein adjustments of the at least one parameter are reproduced in real-time in an output surround sound format audio stream for decoding and playback in a multi-channel listening room or headphones.

* * * * *